Oct. 9, 1934.                L. R. HEIM                1,976,019
                    ART OF MAKING ROLLER BEARINGS
                          Filed Dec. 28, 1928
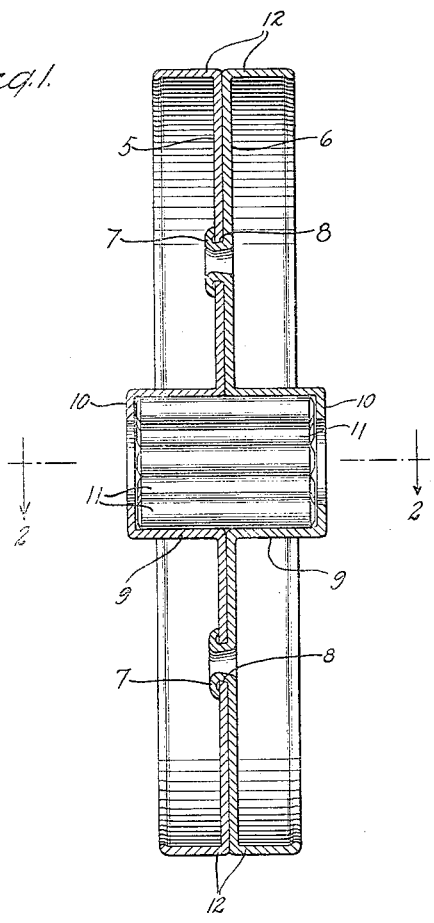
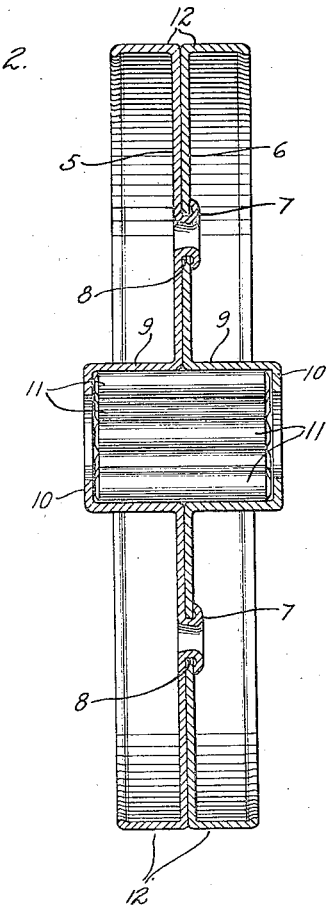
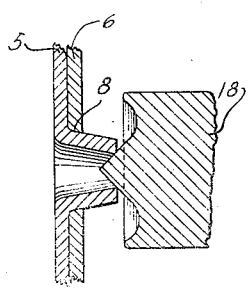
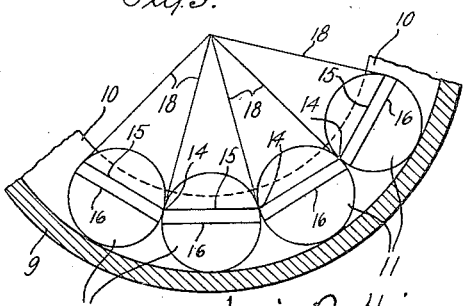
Lewis R. Heim
INVENTOR
BY Robert S. Blair
ATTORNEY Patented Oct. 9, 1934

1,976,019

UNITED STATES PATENT OFFICE 1,976,019

ART OF MAKING ROLLER BEARINGS

Lewis R. Heim, Danbury, Conn.

Application December 28, 1928, Serial No. 328,978

7 Claims. (Cl. 29—148.4)

This invention relates to bearings for pulleys and the like and method of making the same but more particularly to such as are formed of pressed metal.

Among the objects of the invention are to provide a simple and effective method of forming a roller bearing and to provide such a method of a nature which can readily be carried on and result in a durable and inexpensive device. Other objects will be in part obvious and in part pointed out hereinafter.

The invention accordingly consists in the steps and relation of each of the same with respect to one or more of the other steps, all as will be illustrated and herein described and the scope of the application of which will be indicated in the following claims.

The accompanying drawing in which is illustrated a method of carrying on my invention in connection with a pulley is illustrative of one application thereof:

Fig. 1 is a central transverse section,

Fig. 2 is a section on the line 2—2 of Fig. 1,

Fig. 3 is a detail diagrammatical view of the bearing construction, and

Fig. 4 is a detail sectional view.

Similar reference characters refer to similar views throughout the several figures of the drawing.

Referring now to the drawing in detail, there is shown a pulley comprising elements 5 and 6 substantially alike in form and placed face to face in inverse position. These elements may be economically made from sheet metal which is stamped or pressed to provide the proper shape. The term "pulley" is used throughout the present application in its broad sense to include wheels, rollers and like elements.

Each of the elements is provided with one or more bosses as 7 which may be struck from the metal or otherwise formed in any suitable manner and this may be accomplished during the forming of the element. Similarly each element is provided with one or more perforations as 8. In the assembly of the pulley these elements are so disposed relative to each other that a boss on one is opposite a perforation on the other and then the elements are brought substantially face to face. The bosses and perforations are preferably conical in form and of such relative size that a force fit is obtained when the elements are pressed together.

On each element is formed a portion of the housing raceway 9 having an inwardly turned edge as 10 which acts to prevent endwise movement of rolls as 11 in the bearing although sufficient end clearance should be provided in the assembled pulley to prevent interference with the proper movement of the rolls. Likewise the outer portion of each element is bent to form a part of the pulley rim as 12. The shape of this rim will depend upon the purpose for which the pulley is intended.

The rolls 11 are of such diameter that when assembled in the pulley they are each substantially in contact with the next roll on each side thereof as illustrated in Fig. 3. Considering the bearing as viewed in this sectional figure and drawing a straight line as 15 between the points of contact 14 on each roll and a diameter or straight line through the axis of the roll as 16 parallel with line 15, it will be noted that the line 15 is shorter than the line 16 and therefore no roll can pass inwardly between the next adjacent rolls unless it is possible to force these rolls apart a distance at least equal to the length of the diameter 16. Therefore it is desirable that the rolls be of the proper size to accurately provide a total clearance between all the rolls which will be less than the difference in length between the line 15 and the line 16. Thus the rolls retain themselves against lateral displacement within the bearing prior to a shaft being inserted therein as the tendency toward movement is along the radial lines 18 which converge. This self-retaining feature is of considerable importance. Sufficient clearance should be provided by the rolls to permit of a reasonable film of oil on the rolls and it is important that they should not bind.

In the assembly of the pulley the rolls of proper size are inserted endwise into proper position in the cup like housing or raceway portion of one of the elements 5 or 6 with the ends of such rolls resting upon the end flange 10. The other pulley element is then slipped over the projecting end portions of the rolls with the bosses on each element opposite the corresponding perforations in the other element. The two elements are then pressed substantially together, forcing the bosses into the corresponding recess. The projecting end portions of the bosses 7 are then crimped or headed over to form an interlocking connection between the elements.

A convenient method of accomplishing this connection is illustrated in Fig. 4 of the drawing in which a tool as 18 is driven into the open end 19 of the boss 7, causing this end of the boss to be spread or crimped substantially as shown, the elements of course being properly supported on a convenient surface during this operation. Thus the bosses act as a rivet to form a rigid connection between the elements. Other means of attaching these elements may be adopted, as for example, by the use of ordinary rivets, bolts, screws or the like, or by means of electrical or acetylene welding, but it has been found in practice that the forming of bosses and perforations in the manner described is entirely satisfactory.

As already mentioned, each of the elements is preferably substantially alike in form so that these elements may be produced by a single press and the bosses and perforations are so arranged that when one of these formed elements is inverted and placed opposite another, the bosses on one may be brought opposite the perforations in the other. For example, in the embodiment shown two bosses are provided on each element and these are disposed diametrically opposite and at the same distance from the axis. A like number of perforations are provided and in the same arrangement. The diameter on which the perforations occur is disposed at a right angle to that of the bosses so that it is only necessary to invert one element and rotate it through an angle of 90° in order to bring the bosses and perforations in proper relation for the assembly of the elements.

It will thus be seen that there is provided a device in the making of which the various objects of this invention are achieved and that the same is well adapted to meet the hardest conditions of practical use. The method of production is simple, economical and effective.

As various changes might be made in the art hereinbefore set forth without departing from this invention, it is to be understood that all matter hereinbefore set forth or shown in the accompanying drawing is to be interpreted as illustrative and not in a limiting sense.

I claim:

1. The method of making a bearing for a pulley or the like which consists in forming two complementary cup like housing members each having an inner cylindrical bearing surface and an inwardly projecting end flange at one end thereof, forming a set of rolls of a diameter that when the rolls are assembled in the bearing each roll will be held against radial displacement therein by contact between the rolls, inserting the rolls into one of the housing members in proper bearing relation, and placing the other member over the exposed end portions of the inserted rolls.

2. The method of making a bearing of the roller type for a pulley or the like which consists in forming from sheet metal two complementary cup like housing members each having an inner cylindrical bearing surface and an inwardly projecting annular flange at one end thereof, forming a set of rolls each of a diameter that when the rolls are assembled in the bearing each roll will substantially be in contact with the next adjacent rolls and the rolls will be held against lateral displacement therein solely by the contact between the rolls, inserting the rolls into one of said members in proper arrangement with one end of each roll resting on the end flange of the member, sliding the other member over the exposed portions of the inserted rolls, and attaching together the housing members.

3. The method of making a roller bearing which consists in forming out of sheet metal two complementary cup-like housing members each having an inner cylindrical bearing surface and an inwardly projecting end flange at one end thereof and each having an outwardly projecting flange at the adjacent ends thereof, forming an opening in one of the outwardly projecting flanges, drawing or forcing a tube-like projection in the other outwardly projecting flange, lining the cylindrical surface of one of said housing members with a series of contacting rolls whose diameter is so proportioned with respect to the diameter of said bearing surface that the points of contact of the rolls fall in a circle whose radius is less than the difference between the radius of said bearing surface and the radius of the rolls, placing the other housing member over the exposed ends of the rolls in the other housing member and causing said tube-like projection to enter said opening, and expanding said tube-like projection about the opening through which it has been passed.

4. The method of making a roller bearing which consists in forming two complementary housing elements which when joined together form an outer race having an inner cylindrical bearing surface, forming inwardly extending flanges on one end of each of said housing elements, forming a set of rolls whose diameters will be such with respect to the diameter of said bearing surface that when placed about said bearing surface the points of contact of said rolls will lie in a circle smaller in diameter than a circle passing through the axes of said rolls, disposing all of said rolls in one of said housing elements so that portions thereof extend from the end of said housing element opposite the flange formed thereon, slipping the other housing element over the exposed portions of said rolls so that said rolls are enclosed within the outer race, and securing said housing elements to each other.

5. The method of making a roller bearing which consists in forming a metal cylindrical ring of substantially uniform inner diameter, the inner surface of which is shaped and adapted to form the outer raceway for a set of rolls, and sliding endwise into said raceway a set of cylindrical rolls of substantially uniform diameter from end to end and of such size as to fit against each other and against said raceway and lock themselves against inward displacement notwithstanding endwise displacement and thereby provide an inner cylindrical rolling surface, the outward thrust against which would be transverse to the axes of the rolls.

6. The method of making a roller bearing which consists in forming out of sheet metal a cylindrical member having an inwardly directed end flange and having an inner surface of substantially uniform diameter shaped and adapted to form a raceway for rolls, sliding endwise into said raceway, a set of cylindrical rolls of substantially uniform diameter from end to end and of such size as to fit against each other and against said raceway and lock themselves against inward displacement notwithstanding endwise displacement and thereby provide an inner cylindrical rolling surface the outward thrust against which would be transverse to the action of the rolls, placing a metal member against the open end of said first metal member in position to limit the endwise displacement of said rolls and heading over one of said members to interlock with the other and hold said two members together.

7. The method of making a roller bearing which consists in forming a metal cylindrical ring of substantially uniform inner diameter, the inner surface of which is shaped and adapted to form the outer raceway for a set of rolls, sliding endwise into said raceway a set of cylindrical rolls of substantially uniform diameter from end to end and of such size as to fit against each other and against said raceway and lock themselves against inward displacement notwithstanding endwise displacement and thereby provide an inner cylindrical rolling surface the outward thrust against which would be transverse to the axes of the rolls, and mounting a flanged member concentric with respect to said ring and so disposed relative thereto as to resist separation and positioned with its flange limiting the endwise movement of the rolls.

LEWIS R. HEIM.